UNITED STATES PATENT OFFICE.

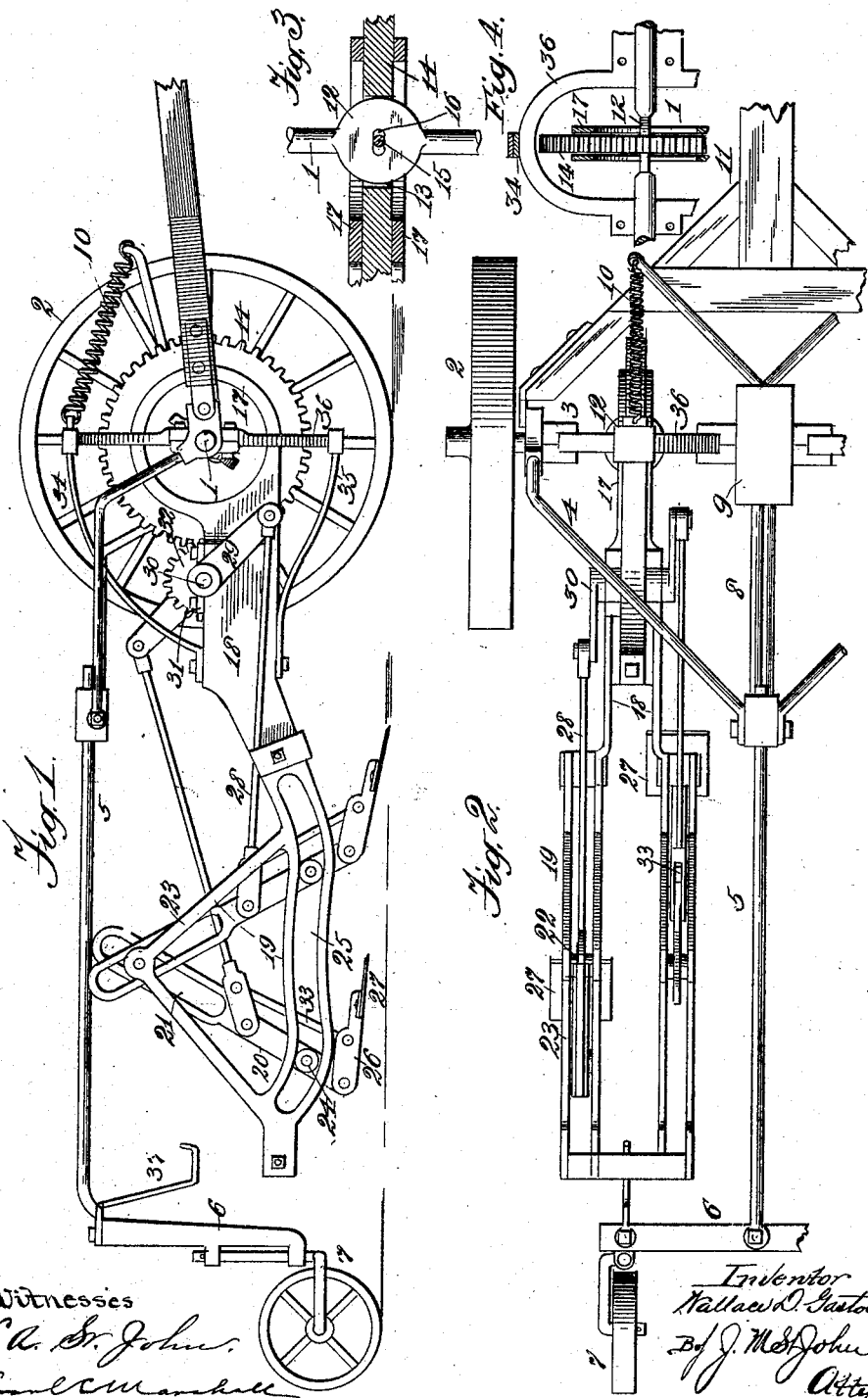

WALLACE D. GASTON, OF TRAER, IOWA.

CULTIVATOR.

No. 923,163.　　　Specification of Letters Patent.　　　Patented June 1, 1909.

Application filed April 19, 1907.　Serial No. 369,094.

*To all whom it may concern:*

Be it known that I, WALLACE D. GASTON, a citizen of the United States, residing at Traer, in the county of Tama and State of Iowa, have invented certain new and useful Improvements in Cultivators, of which the following is a specification.

This invention relates to corn cultivators, and has for its object to produce an implement in which the action of the shovels is similar to that of a hand-operated hoe, whereby the weeds in its path are cut out and destroyed, in connection with a thorough stirring of the soil.

In the operation of an ordinary corn cultivator many of the weeds in its path are merely covered with dirt, through which they spring up in a short time, and others are not even covered, but are simply pushed to one side, where they grow as rank as though undisturbed. To keep a cornfield clean thus requires almost constant cultivating, or the use of a hand hoe, and in either case, the expenditure of a good deal of labor.

This invention is designed to secure, in a cultivator drawn by horses, the action of hand operated hoes, a reciprocating movement being imparted to the shovels, and by this action the weeds in the path of the shovels are cut off at the roots and destroyed, and at the same time the ground is stirred to a suitable depth for good cultivation.

The nature of the invention will clearly appear from the description and claims following, reference being had to the accompanying drawings, in which—

Figure 1 is a side elevation of a machine embodying my invention, with one wheel removed, the better to show the mechanism.
Fig. 2 is a fragmentary top view of the machine, showing a little more than half thereof, it being understood that both sides of the machine are the same. Fig. 3 is a central section of one of the main driving gears and its housing, showing a swivel connection of the gear with the main axle, to allow for the necessary movements of the plow beams. Fig. 4 is a fragmentary view of the front axle and related parts as seen from the rear, showing the manner of mounting the axle and its connected gearing.

Referring now to the drawing, 1 is an axle, on which are mounted driving wheels 2, preferably by the usual ratchet mechanism, not shown. The axle is provided with bearings 3, which connect with diverging arms 4 secured at their rear ends to a reach 5 secured at its rear end to an arch 6 supported on caster-wheels 7; it being understood that the part of the machine broken away in Fig. 2 is similar to the part shown. A part of this reach extends forwardly from the intersection with the diagonal arms, as indicated by the numeral 8, and connects with a bearing 9 mounted on the middle of the axle. Forward of this bearing the two parts of the reach diverge, and form supports for strong springs 10, which partially support the plow-beams, as will be explained presently. The implement is drawn by a tongue 11 connecting with the bearings 3.

Midway between the middle bearing and the side bearings the axle is expanded into circular disks 12, which fit loosely in corresponding slots 13 in driving gears 14. A central pin 15 passes through a slot 16 in each disk, and is secured at each end to the gear. This serves to centralize the gear with respect to the axle, and at the same time allows it to rock or swing in any desired direction. Adjacent to the gear, and forming a lateral housing therefor, is the annular forward end 17 of a plow-beam 18. Each beam forks rearwardly, and between the two parts of the beam 19 is mounted a leg 20, slotted at 21 to take an anti-friction roller 22 pivoted at the convergence of a pair of arms 23 forming a part of each beam. Near the lower end the leg is provided with anti-friction rollers 24 at each side, to run in curved slots 25 formed in the lower parts of the beams. To the lower end of each leg is pivoted a foot 26, to which is secured a shovel 27. Each leg connects by a rod 28 with a crank 29 on a short shaft 30 mounted in bearings 31 on the beam. Between the bearings is a pinion 32 secured to the crank-shaft, and meshing with the main drive-gear above described. Each of these connecting rods also connects with a shoe forward of the leg by a link 33, so that the position of the shovel is positively controlled by said leg and connecting-rod, as clearly shown in Fig. 1. The beams are supported at the forward ends by braces 34 and 35 pivotally connecting with bridges 36 spanning the main drive-gears, and connecting the central and side bearings above described. To the forward end of the upper brace is connected the counterbalance spring 10, which carries most of the weight of the beam and its connections. When not in use the beams are supported at the rear by hooks 37 attached to the rear arch.

The action of the implement will be evident from the foregoing, taken in connection with the illustrations. As it is drawn forward the crank-shaft is driven quite rapidly by its pinion, and a corresponding vibration is imparted to the legs and shovels. The connections are such, as will be seen, that when the cranks move forward the shovels not only move in the same direction, but dip downwardly, cutting into the soil, and severing and uprooting the weeds in their paths. As the cranks pass the center, however, and move backwardly, the shovels are by the same mechanism lifted out of the ground, and are carried through the air to the rearward limit of their movement. This rapid reciprocating movement of the shovels simulates the chopping action of a hand hoe, and produces the same desirable results.

Having thus described my invention, what I claim as new, and desire to secure by Letters Patent, is:

1. In a cultivator, the combination of carrying wheels, an axle driven thereby, gearing connecting with said axle, a crank driven by said gearing, a plow-beam attached to the axle, a leg pivoted to said beam, a shovel pivotally connected with the leg, a connecting rod from the crank to the leg, and a link connecting said rod with the shovel at some distance from the leg.

2. In a cultivator having supporting wheels and an axle driven thereby, the combination of a plow-beam having an upper pivotal point of support for a leg, an extended guide-way for the lower end of the leg, a leg adapted to engage said pivotal point of support and guide-way, a shovel-foot pivoted to the lower end of the leg, a rod pivoted to the leg at a higher point, a link connecting said foot and rod, a crank and gearing actuated by the main axle, and adapted to reciprocate the leg, substantially as described.

3. In a cultivator having carrying wheels and an axle driven thereby, the combination of a beam, reciprocating legs attached thereto, a bridge journaled on the axle, and adapted to support the front end of the beam, gearing adapted to transmit movement to said leg, and a swivel-joint connection of said gearing with the axle, substantially as described.

4. In a cultivator having carrying wheels and an axle driven thereby, a gear having a swiveled connection with the axle, a beam straddling said gear, with housings to hold the gear laterally, a leg pivotally and reciprocatingly mounted on the beam, and mechanism adapted to transmit movement from the gearing to said leg.

5. In a cultivator having carrying wheels and an axle driven thereby, the combination of plow-beams, reciprocating shovels and legs carried thereby, gearing and connecting mechanism adapted to transmit reciprocating movement to said legs, a reach mounted midway of said beams, a caster-supported arch attached to the rear of said reach, diverging forward extensions of the reach, and spring connecting said reach extensions and said beams, and adapted to counterbalance the weight thereof, in whole or in part.

In testimony whereof I affix my signature in presence of two witnesses.

WALLACE D. GASTON.

Witnesses:
J. L. THOMAS,
W. E. STOOKES.